(12) United States Patent
Baak

(10) Patent No.: US 7,710,109 B2
(45) Date of Patent: May 4, 2010

(54) METHOD AND APPARATUS FOR POSITION DETECTION

(75) Inventor: Josef Baak, Waldkirch (DE)

(73) Assignee: Sick AG, Waldkirch/Breisgau (DE)

( * ) Notice: Subject to any disclaimer, the term of this patent is extended or adjusted under 35 U.S.C. 154(b) by 401 days.

(21) Appl. No.: 11/788,387

(22) Filed: Apr. 19, 2007

(65) Prior Publication Data
US 2008/0224692 A1  Sep. 18, 2008

(30) Foreign Application Priority Data
Apr. 20, 2006  (EP)  .................... 06008194

(51) Int. Cl.
*G01B 7/14* (2006.01)
*G01R 33/06* (2006.01)
*H01L 43/06* (2006.01)
*H01L 43/08* (2006.01)

(52) U.S. Cl. .............. 324/207.24; 324/207.2; 324/207.21

(58) Field of Classification Search ............. 324/207.2, 324/207.21, 207.24, 251, 252
See application file for complete search history.

(56) References Cited

U.S. PATENT DOCUMENTS

| | | | |
|---|---|---|---|
| 4,490,674 A | 12/1984 | Ito | |
| 5,621,320 A * | 4/1997 | Yokotani et al. | 324/252 |
| 7,250,753 B2 * | 7/2007 | Terasaki | 324/207.24 |
| 2002/0171418 A1 | 11/2002 | Hinz | |
| 2004/0017187 A1 * | 1/2004 | Van Ostrand et al. | 324/207.21 |
| 2004/0160220 A1 | 8/2004 | Wendt | |
| 2005/0140363 A1 * | 6/2005 | Grimm et al. | 324/207.21 |

FOREIGN PATENT DOCUMENTS

| | | |
|---|---|---|
| DE | 19712829 | 10/1998 |
| DE | 102004060249 | 7/2005 |
| EP | 0726448 | 8/1996 |
| EP | 0979988 | 2/2000 |
| WO | 99/46565 | 9/1999 |

* cited by examiner

*Primary Examiner*—Kenneth J Whittington
(74) *Attorney, Agent, or Firm*—Harness, Dickey & Pierce, P.L.C.

(57) ABSTRACT

A relative position of two articles is determined by generating a magnetic field using a magnetic element of a first article and determining a first measurement value and a second measurement value using a sensor arrangement of a second article, with the first and the second measurement values correlated to the size of the magnetic field in two different spatial directions and correspond to two different magnetic field components. The sensor arrangement is selected such that the first magnetic field component is essentially parallel to the direction of relative movement of the articles and the second magnetic field component is essentially perpendicular to the relative direction of movement of the articles. A difference signal of the absolute magnitudes of the first and second measured values is used to determine the relative position of the first and second articles. A position detector is also provided.

29 Claims, 4 Drawing Sheets

METHOD AND APPARATUS FOR POSITION DETECTION

CROSS-REFERENCE TO RELATED APPLICATIONS

This application claims the benefit of European Patent Application No. 06 008 194.0, filed Apr. 20, 2006. The disclosure of the above application is incorporated herein by reference.

FIELD

The invention relates to a method for the determination of the relative position of two articles in which a magnetic field is generated with the aid of a magnetic element of a first article and a first measurement value and a second measurement value are determined with the aid of a sensor arrangement of a second article, with the first and the second measurement values being correlated with the size of the magnetic field in two different spatial directions and thus corresponding to two different magnetic field components. The invention further relates to a position detector for carrying out the method of the invention.

BACKGROUND

The statements in this section merely provide background information related to the present disclosure and may not constitute prior art.

A method and an apparatus of this kind are known from DE 197 12 829 A1 and are for example used for the determination of the position of the piston in pneumatic cylinders. For this purpose a magnetic element, for example a ring magnet or a disk magnet, is provided at the piston and produces a magnetic field which is detected by a magnetic sensor provided outside of the cylinder. In this arrangement the sensor is for example arranged at the outer wall of the cylinder in that its main axis of sensitivity lies parallel to the direction of movement of the piston. The magnetic field component detected by the sensor and lying parallel to the direction of relative movement of the piston and cylinder is a maximum when a magnet is directly moved passed the sensor. The determination of the maximum can be used to define a position recognition signal which can then serve as a switching point.

The magnetic field that is produced has a plurality of extremes, depending on the sensor element, which can lead to faulty switching when a secondary extremum is incorrectly interpreted as a main extremum. Only when a main extremum is present has the desired switching point however been reached. In order to overcome this problem the known solution proposes to use a second sensor which mainly responds to a magnetic field component lying perpendicular to the direction of relative movement. Its magnitude has a minimum value when the magnet directly passes the sensor. If the first sensor, which responds to the magnetic field component parallel to the direction of movement, just shows a maximum value then it can be determined by checking whether the second sensor just shows a minimum value or whether the maximum shown by the first sensor is a main extremum. In the known solution two different sensor signals accordingly have to be evaluated by two different sensors.

EP 0726448 B1 proposes to define a measurement window by additional sensors prior to and after the switching point in order to blend out possible auxiliary maxima. The measurement window is so arranged that only the main maximum lies in it. Other maxima, which are detected outside of the measurement window, are blended out and are not used as the switching point. Accordingly for this solution three different sensors and their signals have to be used.

Finally it is known from EP 0979988 B1 to use sensors which detect two field components standing perpendicular to one another. The quotient of the two signals is evaluated for the recognition of the relative position.

DE 10 2004 060249 A1 describes a sensor for another application with the aid of which the directional magnetic field is determined. The sensor has a planar soft magnetic structure with at least one first region and one second region which are separated from one another by a first long gap and a second long gap, with the first long gap and the second long gap not being parallel to one another. A first magneto-resistive element and a second magneto-resistive element are arranged along the first gap and the second gap and so designed that they can be electrically connected to a power source and to an electrical measurement unit. The soft magnetic structures serve as magnetic flux guides in order to concentrate the magnetic flux values which are to be detected and to enhance them. Fundamentally, only the component of an applied external magnetic field vector perpendicular to the longitudinal direction of a gap is notably enhanced by the magnetic field guides. Conclusions can be drawn regarding the magnetic field direction from the resistance signals of the magneto-resistive elements arranged in the gaps in DE 10 2004 060 249 A1.

SUMMARY

It is the object of the present invention to set forth a method and an apparatus which are of simple construction and easy to evaluate in order to determine the relative positions of two articles which are preferably movable relative to one another, in particular to determine a switching point during the relative movement.

In the method of the invention a difference signal of the absolute magnitudes of the first and second measured values is used in order to determine relative position of the first article and of the second article.

Depending on the relative position of an article having a magnetic field generating element and an article of the sensor arrangement the magnetic field components which can be measured at the sensor arrangement change. The difference of the magnitudes of the two magnetic field components in different directions can thus be used to determine the relative position of the two articles. For this purpose the sensor arrangement is so designed that it has at least two different main sensitivity directions that is to say can measure two different magnetic field components. In accordance with the invention the difference of the magnitudes of these components or of the magnitudes of the associated measurement signals is used to determine the relative position.

The measurement values are selected in such a way that the first measurement value correlates to a first magnetic field component which is parallel to the direction of movement of the relative movement and a second measurement value correlates with a second magnetic field component which is perpendicular to the direction of relative movement, whereby a signal results which is particularly easy to evaluate.

In particular the method in accordance with the invention is suitable for determining a point in time at which the first and the second article have a predetermined relative position to one another, for example to determine a switching point. This can be achieved in a simple manner in that for example an extremum of the difference signal is evaluated, in particular for example a maximum.

In order to adapt the values which have to be subtracted from one another so that secondary extrema are suppressed as effectively as possible the measurement values can in particular be enhanced by different amounts.

In particular, when the absolute magnitude of one measured value is subtracted from the absolute magnitude of the other measured value, in order to blend out secondary maxima during the measurement of the first measured value, an ideal adaptation can be achieved in this manner in such a way that the secondary maxima are reduced by an adequate amount through the difference formation.

In order that possible secondary maxima in the signal which corresponds to the magnetic field component parallel to the direction of movement can be blended out as effectively as possible, it is advantageous when the measured value which corresponds to the magnetic field component perpendicular to the direction of movement is enhanced more strongly than the other measured value.

The magnetic field generating element is advantageously so selected that with a relative movement of the articles, and at a point in time when the magnetic field generating element is closest to the sensor arrangement, the measured magnetic field component parallel to the direction of movement has its largest magnitude while the magnetic field component perpendicular thereto is equal to zero.

The sensor arrangement can include Hall elements, the measurement signals of which are used for the difference formation. In this connection Hall elements are used which are arranged in the sensor arrangement such that their measurement signals change differently with a movement of the articles relative to one another.

In another embodiment resistance values of at least two magneto-resistive elements are used for the determination of the measured values, with the magneto-resistive elements being arranged in the sensor arrangement such that their resistance values change differently on a movement of the articles relative to one another. Resistance values can easily be read out and can be processed further simply.

In one possible way of conducting the method the signals of the magneto-resistive elements are first used in order to determine the size of magnetic field components in the different spatial directions. Then the difference of the absolute magnitudes of these magnetic field components is formed in order to produce the difference signal in accordance with the invention, from which the relative position can be determined.

A simpler embodiment provides for the signals of the magneto-resistive elements to be directly used in order to form the difference signal. Depending on the measurement geometry the resistances measured in the sensor arrangement or the voltage values which can be tapped off across the resistances are subtracted from one another after formation of the absolute magnitudes. An explicit determination of the magnetic field components is not then necessary.

Corresponding ways of conducting the method are also possible when using Hall elements.

A particularly advantageous embodiment of the method of the invention provides that at least four magneto-resistive elements are used which are connected to one another in the manner of a bridge circuit. When, for example, in each case two magneto-resistive elements are connected in series in each branch of the bridge circuit, with the magneto-resistive elements being so arranged that their resistance values change differently during the relative movement of the first article and the second article then, with a cunning choice of the voltage taps at the bridge, the difference signal to be used in accordance with the invention can be directly determined.

The magnetic flux which is produced by the magnetic element at the first article can be enhanced at the location of the magneto-resistive elements of the sensor arrangement of the second article by field influencing elements which are preferably manufactured of soft magnetic material. The magnetic field components which are detected by the magneto-resistive elements are thus already enhanced by the measurement layout.

The use of such field influencing magnetic field guides is particularly advantageous when using magneto-resistive elements in the sensor arrangement. Their use is, however, also conceivable with other measurement elements such as for example Hall elements.

The method in accordance with the invention can be particularly advantageously used in order to determine the relative position of a cylinder (for example of a pneumatic cylinder) and of a piston running therein. In this connection it is particularly simple when the piston is equipped with the magnetic field generating magnetic element and the cylinder carries the sensor arrangement, for example at the outer wall. By way of example, the first magnetic field component then advantageously corresponds to a direction essentially parallel to an axial direction of the cylinder or of the piston and the second magnetic field component to a direction essentially parallel to a radial direction of the cylinder or of the piston.

A position detector in accordance with the invention serves to carry out a method in accordance with the invention and has in particular an evaluation circuit which has at least one first part which serves for the formation of a difference signal of the absolute magnitudes of the first and second measured values. In the position detector in accordance with the invention the sensor arrangement is, moreover, so arranged that the first magnetic field component is essentially parallel to the direction of relative movement and the second magnetic field component is essentially perpendicular to the direction of relative movement.

For automatic evaluation, provision can be made that the evaluation circuit includes a second part for the determination of the relative position of the first article and the second article from the difference signal. For example it can be evaluated, for this purpose, at what time the difference signal shows a maximum when the first and second articles are moved relative to one another. The determination of this maximum can advantageously be used in order to fix a switching point.

A particularly preferred embodiment of the position detector in accordance with the invention has at least four magneto-resistive elements which are connected to one another in a bridge circuit. In this connection the magneto-resistive elements can be so selected that they have the same resistance values in the magnetic field free case and so that, in each case, two magneto-resistive elements are connected in series in each branch of the bridge circuit and are arranged such that the resistance values change differently during relative movement of the first article and of the second article. The voltage signal measured between the respective centre positions of the bridge circuit corresponds to the difference signal used in accordance with the invention, so that the bridge circuit is included in the first part of the evaluation circuit.

Field influencing elements can be provided which preferably consist of soft magnetic material and serve for the enhancement of the measured values. The field influencing elements are so arranged that they enhance the magnetic flux at the location of the magneto-resistive elements.

The sensor arrangement can have individual sensors for the measurement of individual magnetic field components in the different directions which are not necessarily arranged at the same location. An arrangement is however particularly advantageous in which all elements of the sensor arrangement and the optionally present field influencing elements are arranged close to one another, in particular on one chip. This ensures a compact construction and a reliable measurement.

Other advantageous embodiments of the position detector of the invention and the advantageous manners of operation resulting from them can be seen from the above discussion of the embodiments of the method of the invention.

The invention in particular avoids the development and checking complexity which was necessary in the prior art solutions in order for example to adapt a switching point for a specific series of cylinders. The suppression of the secondary maxima of the magnitude of the one measurement signal by subtraction of the magnitude of another measurement signal of the same sensor arrangement is independent of the individual application.

By way of example, when used as a position detector in a piston-in-cylinder arrangement for the determination of a switching point the sensor arrangement switches unambiguously with different types of cylinder.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 4b illustrates the magnitudes of the field components of FIG. 4a; and

DETAILED DESCRIPTION

Figure 1:
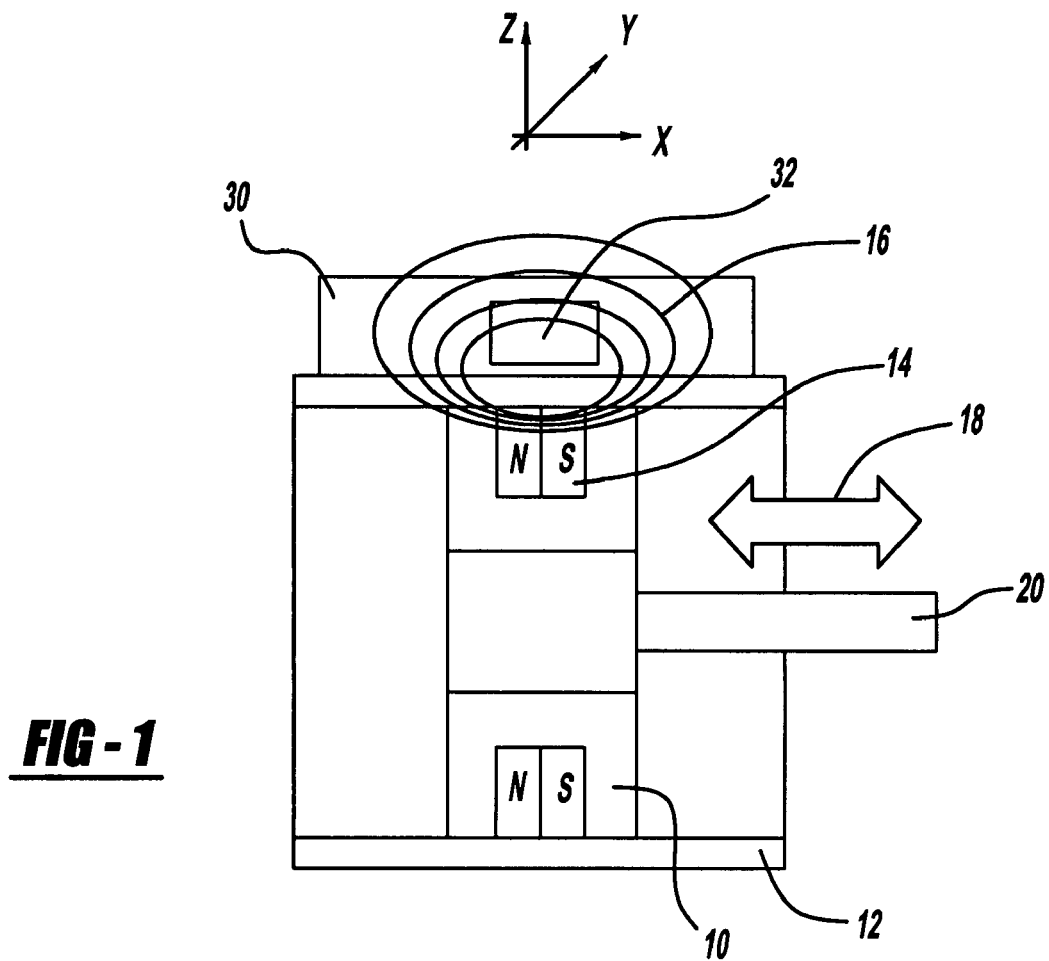
FIG. 1 is a schematic cross-section through a piston-in-cylinder arrangement with an arrangement in accordance with the invention.

The following description is merely exemplary in nature and is not intended to limit the present disclosure, application, or uses. It should be understood that throughout the drawings, corresponding reference numerals indicate like or corresponding parts and features.

An apparatus in accordance with the invention is schematically shown in FIG. 1. A piston 10 with a piston rod 20 moves in a cylinder 12, for example in a pneumatic cylinder. A ring magnet 14 is mounted in a groove arranged at the periphery of the piston 10 with the north and south poles of the ring magnet being arranged as shown. By way of example, the field line directions of the field lines 16 is shown at one point such as is present in the marginal region of the piston or of the cylinder 12. The cylinder moves to and fro in the direction of the arrow 18.

A sensor element 32 is arranged on a circuit board at the outer periphery of the cylinder 12. It serves for the evaluation of the magnetic field components which result through the field lines 16. The construction of the sensor element 32 will be explained in detail with respect to FIGS. 2 and 3. For explanatory purposes a Cartesian coordinate system with the axes x, y and z is set out. In accordance with the geometry of the arrangement shown the x-direction corresponds to the axial direction and the z-direction to the radial direction with respect to the cylinder 12 or to the piston 10 running therein.

Figure 2:
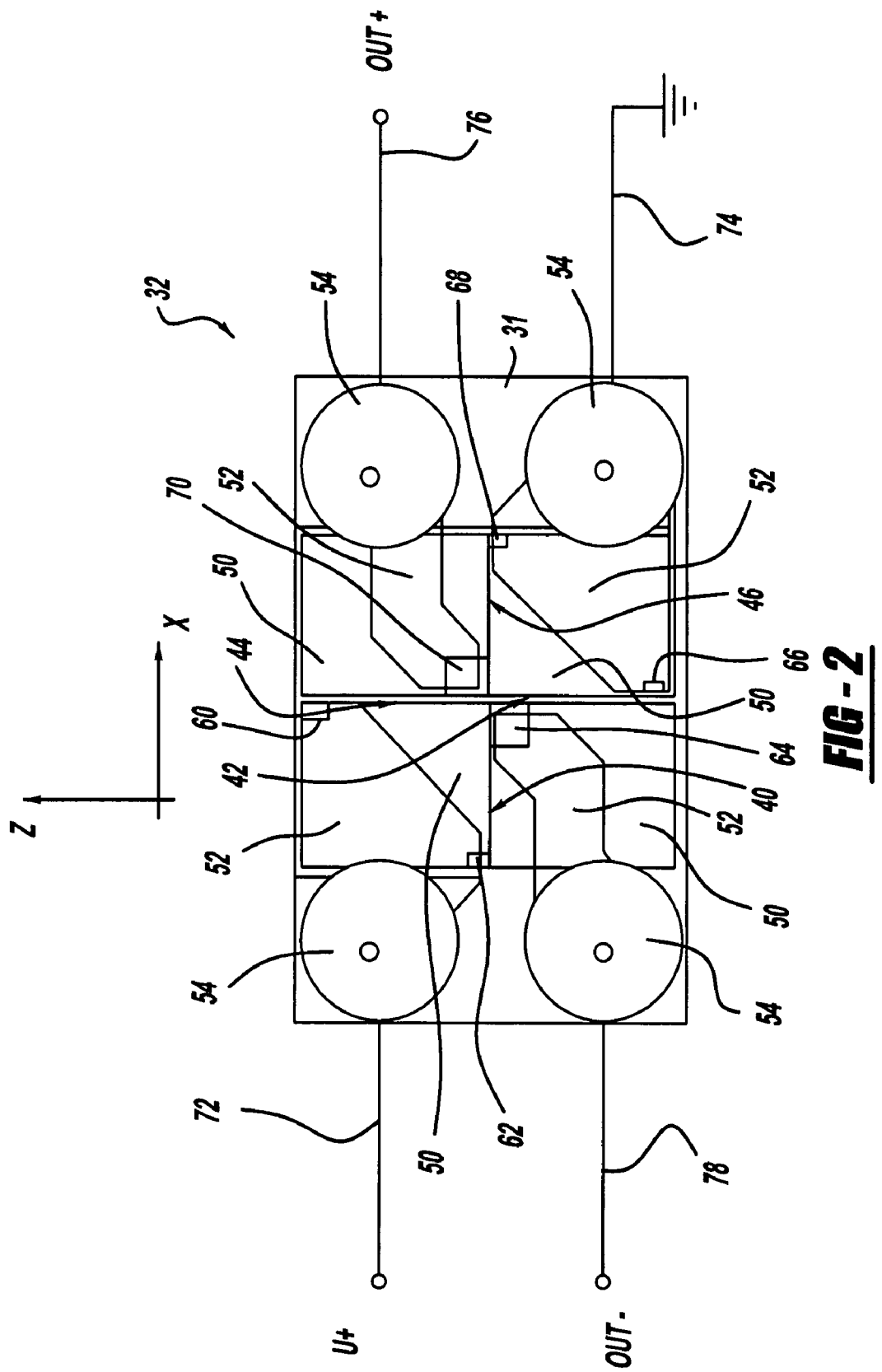
FIG. 2 is a plan view of a sensor used in accordance with the invention.

FIG. 2 shows the plan view of a sensor element. All elements at the sensor are arranged on the chip 31. The chip 31 is itself arranged on the circuit board 30 which is shown in FIG. 1. The axial direction x and the radial direction z are also indicated in FIG. 2. The chip 31 is accordingly arranged such that it is located on a radial plane which extends radially outwardly from the cylinder axis 12.

The sensor arrangement 32 is similarly constructed to the sensor elements which are used for the measurement of the magnetic field direction as described in DE 10 2004 060249 A1. Radial sensor strips 40 and 46 and axial sensor strips 42 and 44 are manufactured of material which has for example an AMR effect (anisotropic magneto-resistance effect) or a GMR effect (giant magneto-resistance effect). They can be contacted via electrodes 52 with so-called bumps (for example tin solder) 54. The axial sensor strip 44 is contacted via the electrical contacts 60, 70 whereas the radial contact strip 46 is contacted via contacts 70 and 68. Contacts 66 and 64 serve for the contacting of the other axial sensor strip 42 whereas the other radial sensor strip 40 can be contacted via contacts 62 and 64. The elements 50 include soft magnetic regions which act as magnetic flux guides. Gaps are present between the magnetic flux guides 50 in which the sensor strips 40, 42, 44, 46 are arranged as indicated. Depending on the geometry and the arrangement of the magnetic flux guides the magnetic field between the soft magnetic regions, i.e. in the interior of these gaps is enhanced. In this connection only those components of the magnetic field are notably enhanced which are aligned perpendicular to the longitudinal direction of the respective gap. The arrangement is so selected that the sensor strips 42, 44 only detect the axial components in the x-direction of a magnetic field acting from the outside and the magneto-resistive sensor strips 40, 46 only detect the radial components in the z-direction of the magnetic field applied from the outside.

As a result of the magneto-resistive characteristics of the sensor strips 40, 42, 44, 46 their resistance chances on the application of the magnetic field. The different arrangement of the magneto-resistive sensor strips, in particular in the gaps between the magnetic flux guides 50 brings about a different change of the electrical resistance of the individual sensor elements in a magnetic field applied from the outside.

It is clear that the sensor strips 40, 42, 44, 46 are connected to one another in the manner of a Wheatstone bridge.

Figure 3:
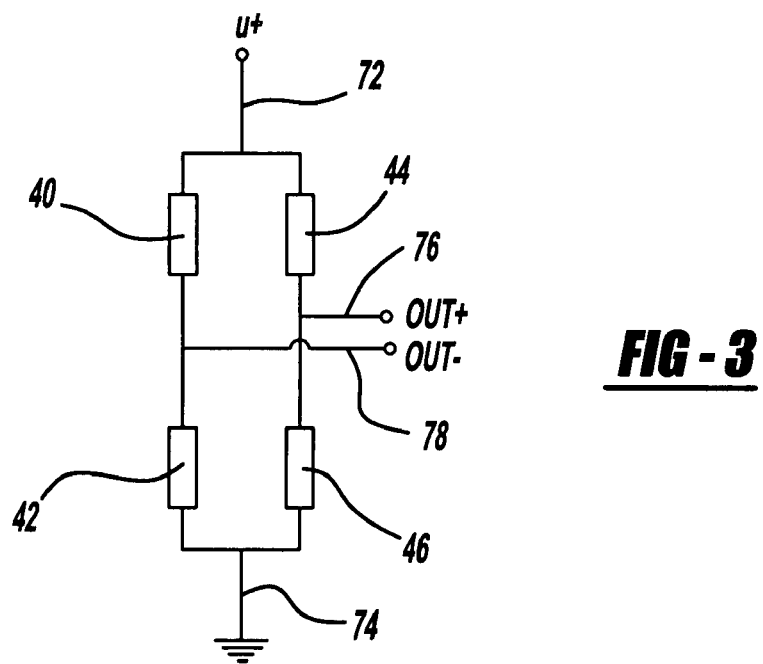
FIG. 3 illustrates an equivalent circuit diagram of the arrangement shown in FIG. 2.

FIG. 3 shows a corresponding equivalent circuit diagram. If a voltage U+ relative to earth (connection 74) is applied to the connection 72 then a current flows through the bridge circuit. The measured voltage OUT+ to OUT− can be tapped off between the connections 76, 78.

The voltage difference between the connections OUT+ and OUT− corresponds to the difference between the magnitudes of the axial and radial field components.

The apparatus in accordance with the invention is used as follows. The piston 10 moves to and fro in the cylinder 12. The magnetic field lines 16 move together with the ring magnet 14. Accordingly the axial and radial magnetic field components vary at the location of the sensor element 32.

Figure 4A:
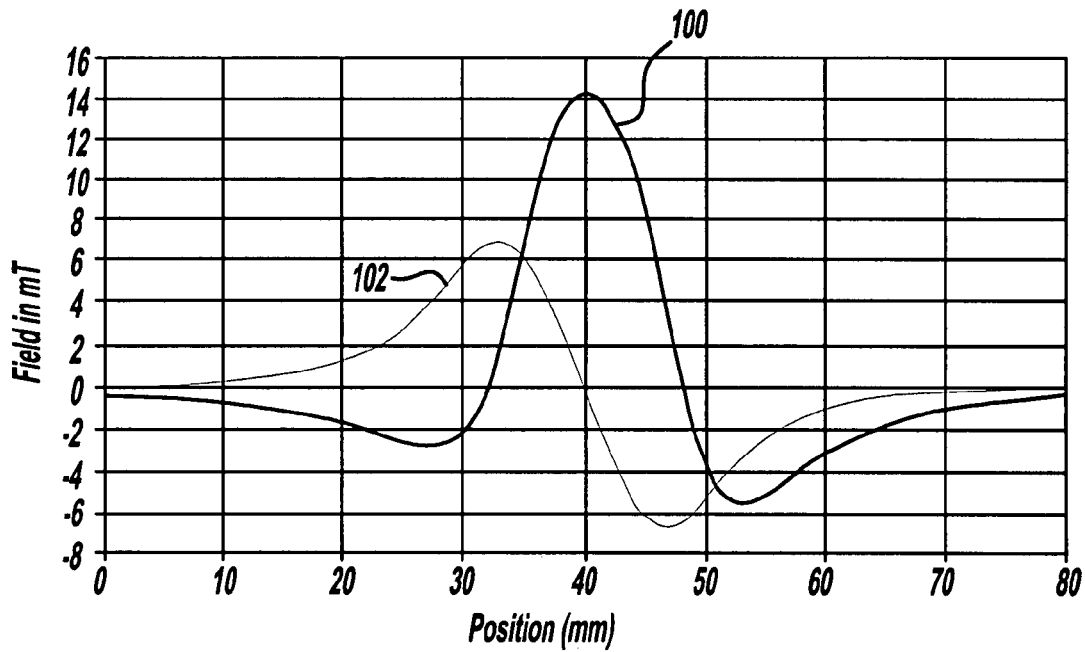
FIG. 4a illustrates magnetic field components of the ring magnet in different spatial directions.

FIG. 4a shows the magnetic flux density generated at the location of the sensor element 32 by the ring magnet 14 in dependence on the piston position. The reference numeral 100 designates the axial field and 102 designates the radial field component. In the illustrated embodiment the sensor element 32 and the ring magnet 14 have their closest proximity to one another at the piston position "40 mm".

Figure 4B:
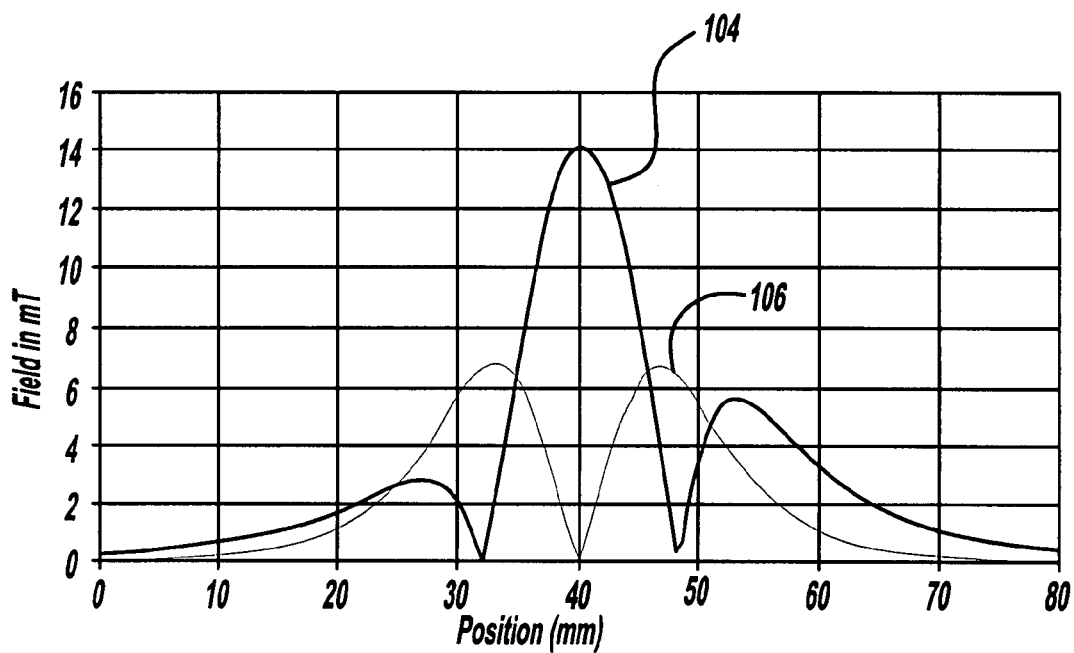

From this, the absolute magnitudes of the individual field components in FIG. 4b result. The magnitude of the axial field component is designated in FIG. 4b with 104 whereas the magnitude of the radial field component is designated in FIG. 4b with 106.

Figure 4C:
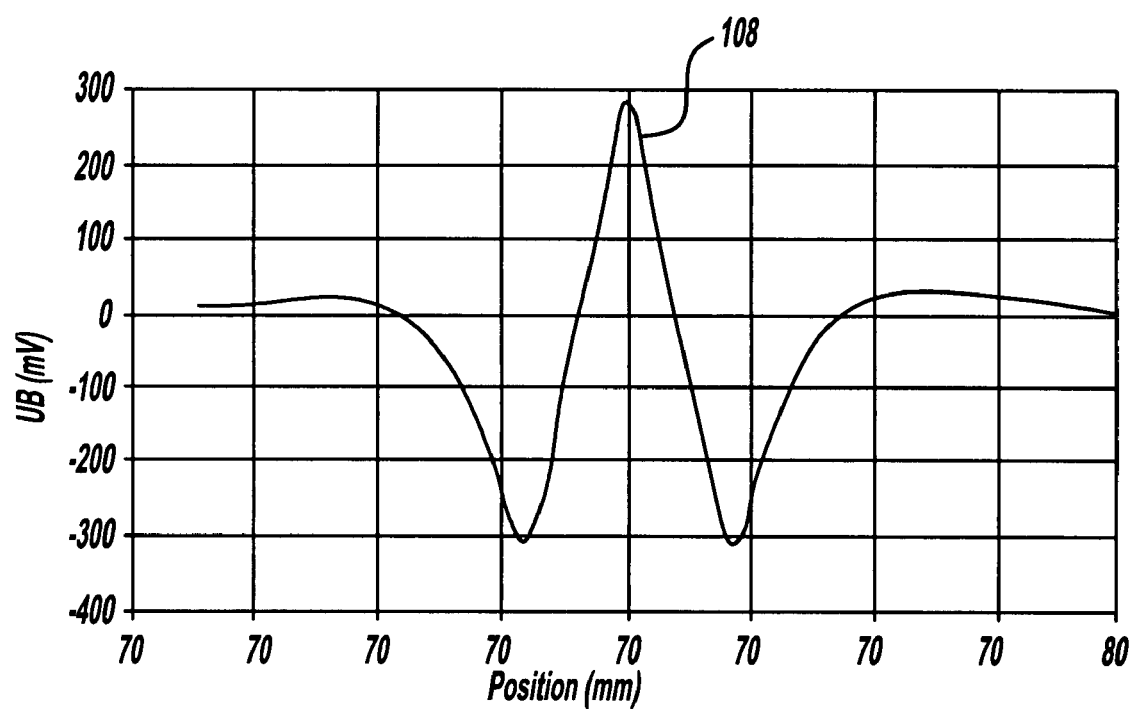
FIG. 4c illustrates a measurement signal of an arrangement in accordance with the invention.

FIG. 4c shows the voltage plug $U_B$ which can be tapped off between the connections OUT+ and OUT− of the bridge circuit. The plot in dependence on the piston position is designated with 108.

The curve 108 shows in addition to the prominent main maximum only small negligible further positive maxima. The main maximum can accordingly be detected well and reliably, for example with a threshold circuit.

The measured signal corresponds to the following formula:

$$S = a \cdot |B_{ax}| - b \cdot |B_{rad}|$$

Here $B_{ax}$ is the axial component of a magnetic field and $B_{rad}$ the radial component of the magnetic field. a and b are enhancement factors. It has proved advantageous when the enhancement factor b for the radial component is larger than the enhancement factor a for the axial component.

The enhancement of the magnetic field components advantageously takes place via field influencing elements of soft magnetic material. In the preferred embodiment shown in which such magnetic flux guides are used the enhancement factors are determined by the geometry and the material choice of these magnetic flux guides. In other embodiments which use other geometries the enhancement factors are for example determined electronically.

In the described preferred embodiment four individual magneto-resistive elements are combined into a Wheatstone bridge, with one sensor element for the detection of the axial field component and one sensor element for the detection of the radial field component being located in each branch of the bridge. An arrangement of this kind enables the difference formation for evaluation purposes in simple manner by the voltage tap between the connections OUT+ and OUT−. In particular no additional electronic evaluation circuit is necessary for the difference formation.

However, other embodiments are also possible in which magneto-resistive elements are provided for the determination of the axial field components and other magneto-resistive elements for the determination of the radial field components and wherein the difference is for example determined electronically with the aid of a microprocessor.

Yet other embodiments provide Hall elements for the determination of the individual field components.

For example, with the described preferred arrangement in the form of a Wheatstone bridge, the axial and radial field components are measured at one location. In other embodiments the axial field components and the radial field components can be measured spatially separated. Then the radial field component is preferably measured closer to the transducer magnet in order to obtain a larger signal for the radial component whereby the suppression of possible secondary maxima in the axial component is improved.

The magneto-resistive elements and/or the Hall elements and the field influencing elements can be arranged on a single chip, for example using thin film technology, and can thus be manufactured and used simply and at favourable cost.

As can be seen in particular from FIG. 4c the use of the difference signal improves the temperature drift of the sensor because the sensor signal itself has a steeper flank than the axial field component signal directly used in earlier sensor arrangements.

With the invention the development and testing complexity which was necessary for solutions in the prior art in order to adapt the switching point for example for a specific series of cylinders and to blend out the secondary maxima of the measured magnetic field component can be avoided. The sensor can be used with all current cylinder types in order to determine an unambiguous switching point.

A sensor arrangement which has once been adjusted for a piston-in-cylinder arrangement, for example by a suitable choice of the enhancement factors a, b for the measurement values, can also be used for other arrangements without new adjustment.

The position detector in accordance with the invention is particularly well suited for the determination of a unique switching point. The difference signal of optionally amplified magnitudes of the measurement signals is evaluated in order, for example, to determine a switching point at the maximum.

The position detector can for example be used as a cylinder sensor in pneumatic cylinders. Another application provides for use as a magnetic proximity sensor for the detection of a transducer magnet moving in the longitudinal direction or in the transverse direction.

The description of the invention is merely exemplary in nature and, thus, variations that do not depart from the gist of the invention are intended to be within the scope of the invention. Such variations are not to be regarded as a departure from the spirit and scope of the invention.

REFERENCE NUMBER LIST 10 piston
12 cylinder
14 ring magnet
16 field lines
18 cylinder movement
20 piston rod
30 circuit board
31 chip
32 sensor element
40 radial sensor strip
42 axial sensor strip
44 axial sensor strip
46 radial sensor strip
50 magnetic flux guide
52 electrode
54 tin solder
60, 62, 64, 66, 68, 70 electrical contacts
72, 74, 76, 78 electrical connections
100 axial field component
102 radial field component
104 absolute magnitude of the axial field component
106 absolute magnitude of the radial field component
108 difference signal

What is claimed is:

1. A method for the determination of the relative position of two articles, comprising:
   generating a magnetic field with the aid of a magnetic element of a first article;
   determining a first and a second measurement value with the aid of a sensor arrangement of a second article, with the first and the second measurement values being correlated with the size of the magnetic field in two different spatial directions and thus corresponding to two different magnetic field components;

selecting the sensor arrangement such that the first magnetic field component is essentially parallel to the direction of relative movement of the articles and the second magnetic field component is essentially perpendicular to the relative direction of movement of the articles;

using a difference signal (108) of the absolute magnitude of the first and second measured values (100, 102) in order to determine the relative position of the first and second articles (10, 12); and enhancing the first and the second measured values prior to determining the difference by enhancing the measured value, which corresponds to the magnetic field component essentially perpendicular to the direction of movement, more strongly than the measured value, which corresponds to the magnetic field component essentially parallel to the direction of movement.

2. A method in accordance with claim 1, wherein the articles (10, 12) are moved relative to one another.

3. A method in accordance with claim 2, further comprising determining a point in time from the difference signal (108), at which the first article (10) and the second article (12) have a predetermined relative position to one another, preferably in order to determine switching point.

4. A method in accordance with claim 3, wherein a position of an extremum of the difference signal (108) is used to determine the point in time.

5. A method in accordance with claim 1, wherein measurement signals of at least two Hall elements are used as the measured values with the Hall elements being arranged in the sensor arrangement so that their measurement signals change differently on a movement of the articles relative to one another.

6. A method in accordance with claim 1, wherein resistance values of at least two magneto-resistive elements are used for the determination of the measured values, with the magneto-resistive elements being arranged in the sensor arrangement in such a manner that their resistance values change differently on a movement of the articles relative to one another.

7. A method in accordance with claim 6, wherein the signals of the magneto-resistive elements are used for the determination of the first and second magnetic field components and the absolute magnitudes of the first and second magnetic field components are used for the difference formation.

8. A method in accordance with claim 6, wherein the absolute magnitudes of the signals of the magneto-resistive elements are used for the difference formation.

9. A method in accordance with claim 6, wherein at least four magneto-resistive elements (40, 42, 44, 46) are used, which are connected to one another in the form of a bridge circuit in such a way and are arranged relative to one another in the sensor arrangement (32) in such a way that the signal taken from the bridge circuit corresponds to the difference of the magnitude of a first measured value corresponding to the first magnetic field component and the magnitude of a second measured value correspond to the second magnetic field component and this difference signal (108) is used for the determination of the relative position of the first article (10) and the second article (12).

10. A method in accordance with claim 6, further comprising enhancing the magnetic flux with the aid of field influencing elements (50), preferably of soft magnetic material, at the magneto-resistive elements (40, 42, 44, 46).

11. A method in accordance with claim 1, wherein the first and the second articles include a cylinder (10) and a piston (12).

12. A method in accordance with claim 11, wherein the piston (10) is equipped with the magnetic field producing magnetic element (14) and the cylinder (12) with the sensor arrangement (32).

13. A method in accordance with claim 11, wherein the direction of the first magnetic field component corresponds essentially to an axial direction and the direction of the second magnetic field component corresponds essentially to a radial direction with respect to the cylinder (12) or piston (10).

14. A position detector for detecting the relative position of two articles, comprising:

a magnetic field producing magnetic element provided at a first article;

a sensor arrangement provided at a second article for the determination of a first measured value and a second measured value, with the first and the second measured values correlating with the size of the magnetic field in two different spatial directions and thus corresponding to two different magnetic field components, wherein the sensor arrangement (32) is arranged such that the first magnetic field component is essentially parallel to the direction of relative movement (18) of the articles and the second magnetic field component (18) is essentially perpendicular to the direction of relative movement (18) of the articles; and an evaluation circuit having a first part for the formation of a difference signal (108) of the magnitudes of the first and second measured values (100, 102), the first part of the evaluation circuit is designed in such a way that the first measured value and the second measured value are enhanced prior to the difference formation, wherein the measured value which corresponds to the magnetic field component substantially perpendicular to the direction of movement (18) is more strongly amplified than the measured value which corresponds to the magnetic field component essentially parallel to the direction of movement.

15. A position detector in accordance with claim 14, wherein the evaluation circuit includes a second part for the determination of a relative position of the first and second articles (10, 12) from the difference signal (108).

16. A position detector in accordance with claim 15, wherein the second part of the evaluation circuit is adapted to determine a point in time from the difference signal (108) at which the first article (10) and the second article (12) have a predetermined relative position to one another, preferably for the determination of a switching point.

17. A position detector in accordance with claim 14, wherein the sensor arrangement includes at least two Hall elements which are arranged in such a way to the relative direction of movement of the articles that their measurement signals change differently on a movement of the articles relative to one another.

18. A position detector in accordance with claim 14, wherein the sensor arrangement (32) includes at least two magneto-resistive elements (40, 42, 44, 46) which are so arranged to the direction (18) of relative movement of the articles (10, 12) that their resistance values change differently on a movement of the articles (10, 12) relative to one another.

19. A position detector in accordance with claim 18, wherein the evaluation circuit uses the signals of the magneto-resistive elements for the determination of the first and second magnetic field components and uses the first and second magnetic field components as the first and second measured values.

20. A position detector in accordance with claim 18, wherein the evaluation circuit uses the signals of the magneto-resistive elements as the first and second measured values.

21. A position detector in accordance with claim 18, wherein the sensor arrangement (32) includes at least four magneto-resistive elements (40, 42, 44, 46) which are connected to one another in a bridge circuit.

22. A position detector in accordance with claim 21, wherein the magneto-resistive elements (40, 42, 44, 46) are so selected that they have the same resistance values in the magnetic field free case and in each case two magneto-resistive elements are connected in series in each branch of the bridge circuit and are arranged such that their resistance values change differently on the relative movement (18) of the first article (10) and of the second article (12).

23. A position detector in accordance with claim 22, wherein the signal tap at the bridge circuit is such that the signal taken from the bridge circuit corresponds to the difference of the magnitudes of the measured values so that the bridge circuit is included in the first part of the evaluation circuit.

24. A position detector in accordance with claim 14, wherein the sensor arrangement (32) includes field influencing elements (50), preferably of soft magnetic material for the enhancement of the measured values.

25. A position detector in accordance with claim 14, wherein the elements (40, 42, 44, 46, 50, 52) of the sensor arrangement are arranged on a common chip (31) forming a sensor element.

26. A position detector in accordance with claim 14, wherein the first article and the second article include a cylinder (12) and a piston (10) with the piston preferably forming the first article with the magnetic field generating element (14) and the cylinder forming the second article with the sensor arrangement (32).

27. A position detector in accordance with claim 26, wherein the direction of the first magnetic field component corresponds essentially to an axial direction and the direction of the second magnetic field component corresponds essentially to a radial direction of the cylinder (12) or of the piston (10).

28. A position detector in accordance with claim 14, wherein the magnetic field generating magnetic element includes a ring magnet (14).

29. A position detector in accordance with the claim 28, wherein the ring magnet (14) is provided in a groove arranged at the periphery of the piston (10).

* * * * *